(12) United States Patent  (10) Patent No.: US 7,474,298 B2
Nguyen et al.  (45) Date of Patent: Jan. 6, 2009

(54) MOBILE DEVICE HAVING AN ADJUSTABLE LENGTH TO SELECTIVELY EXPOSE A SURFACE COMPONENT

(75) Inventors: Huy Nguyen, San Jose, CA (US); Lawrence Lam, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

(21) Appl. No.: 10/159,572

(22) Filed: May 31, 2002

(65) Prior Publication Data

US 2003/0222847 A1  Dec. 4, 2003

(51) Int. Cl.
*G09G 5/00* (2006.01)
*G06F 1/00* (2006.01)

(52) U.S. Cl. .................. 345/169; 345/156; 361/681; 455/575.1

(58) Field of Classification Search .................. 345/169, 345/168, 179, 901, 905, 156, 158, 173; 358/909.1; 396/342; 348/207, 373, 374, 375, 376; 361/679, 361/686; 455/556, 556.1, 550
See application file for complete search history.

(56) References Cited

U.S. PATENT DOCUMENTS

| 4,279,021 | A | 7/1981 | See et al. |
|---|---|---|---|
| 4,415,065 | A | 11/1983 | Sandstedt |
| 4,587,630 | A | 5/1986 | Straton et al. |
| 4,725,694 | A | 2/1988 | Auer et al. |
| 4,764,770 | A | 8/1988 | Church |
| 4,887,212 | A | 12/1989 | Zamora et al. |
| 4,892,981 | A | 1/1990 | Soloway et al. |
| 4,916,441 | A | 4/1990 | Gombrich |
| 5,010,547 | A | 4/1991 | Johnson et al. |
| 5,012,219 | A | 4/1991 | Henry |
| D320,598 | S | 10/1991 | Auerbach et al. |
| 5,067,164 | A | 11/1991 | Denker et al. |
| 5,075,684 | A | 12/1991 | DeLuca |
| 5,101,439 | A | 3/1992 | Kiang |
| 5,109,539 | A | 4/1992 | Inubushi et al. |
| D326,451 | S | 5/1992 | Roegner |
| 5,218,188 | A | 6/1993 | Hanson |
| 5,227,614 | A | 7/1993 | Danielson et al. |
| 5,235,561 | A | 8/1993 | Seager |

(Continued)

FOREIGN PATENT DOCUMENTS

EP  0149762  7/1986

(Continued)

OTHER PUBLICATIONS

International Search Report and Written Opinion of the International Searching Authority in International Application PCT/US2002/26197, ISA/US, Dec. 13, 2002, 4 pgs.

(Continued)

*Primary Examiner*—Duc Q Dinh
(74) *Attorney, Agent, or Firm*—Shemwell Mahamedi LLP

(57) ABSTRACT

A handheld computer is provided having a variable length and exposable surface component. The component is operable at a designated length of the handheld computer. A housing of the handheld computer may be adjusted to that the component is exposed or enclosed. When exposed, an application associated with the component may be launched by a processor of the handheld computer.

14 Claims, 7 Drawing Sheets

U.S. PATENT DOCUMENTS

| | | | |
|---|---|---|---|
| 5,307,086 A | 4/1994 | Griffin et al. | |
| 5,334,824 A | 8/1994 | Martinez | |
| 5,335,276 A | 8/1994 | Thompson et al. | |
| 5,336,001 A | 8/1994 | Lichtenberg | |
| 5,345,615 A | 9/1994 | Garofalo | |
| 5,357,065 A | 10/1994 | Mitamura et al. | |
| 5,359,317 A | 10/1994 | Gomez et al. | |
| 5,379,057 A | 1/1995 | Clough et al. | |
| 5,381,387 A | 1/1995 | Blonder et al. | |
| 5,392,447 A | 2/1995 | Schlack et al. | |
| 5,394,140 A | 2/1995 | Wong et al. | |
| D359,920 S | 7/1995 | Skamoto | |
| 5,440,629 A | 8/1995 | Gray | |
| 5,442,406 A | 8/1995 | Altmanshofer et al. | |
| 5,450,619 A | 9/1995 | Maeda | |
| 5,465,401 A | 11/1995 | Thompson | |
| 5,494,363 A | 2/1996 | Hochgesang | |
| 5,503,484 A | 4/1996 | Louis | |
| 5,510,808 A | 4/1996 | Cina | |
| 5,584,054 A | 12/1996 | Tyneski et al. | |
| 5,612,682 A | 3/1997 | DeLuca et al. | |
| 5,619,555 A | 4/1997 | Fenton et al. | |
| 5,627,978 A | 5/1997 | Altom et al. | |
| 5,646,402 A * | 7/1997 | Khovaylo et al. | 250/234 |
| 5,650,776 A | 7/1997 | Mitchell et al. | |
| 5,661,641 A | 8/1997 | Shindo | |
| 5,705,995 A | 1/1998 | Laflin et al. | |
| 5,719,936 A | 2/1998 | Hillenmayer | |
| 5,742,894 A | 4/1998 | Jambhekar et al. | |
| 5,745,904 A | 4/1998 | King et al. | |
| 5,754,636 A | 5/1998 | Bayless et al. | |
| 5,779,030 A | 7/1998 | Ikegami et al. | |
| 5,797,089 A | 8/1998 | Nguyen | |
| 5,797,098 A | 8/1998 | Schroeder et al. | |
| 5,809,115 A | 9/1998 | Inkinen | |
| 5,812,651 A | 9/1998 | Kaplan | |
| 5,813,778 A | 9/1998 | Shi | |
| 5,815,142 A | 9/1998 | Allard et al. | |
| 5,821,881 A | 10/1998 | Fischer et al. | |
| D401,577 S | 11/1998 | Yamaguchi | |
| 5,848,356 A | 12/1998 | Jambhekar et al. | |
| 5,860,074 A | 1/1999 | Rowe et al. | |
| 5,873,108 A | 2/1999 | Goyal et al. | |
| 5,898,600 A | 4/1999 | Isashi | |
| 5,903,852 A | 5/1999 | Schaupp et al. | |
| 5,917,905 A | 6/1999 | Whipple et al. | |
| 5,917,906 A | 6/1999 | Thornton | |
| 5,922,071 A | 7/1999 | Taylor et al. | |
| 5,941,648 A | 8/1999 | Robinson et al. | |
| 5,949,764 A | 9/1999 | Yoshida et al. | |
| 5,958,006 A | 9/1999 | Eggleston et al. | |
| 5,974,334 A | 10/1999 | Jones | |
| D416,256 S | 11/1999 | Griffin et al. | |
| 6,002,944 A | 12/1999 | Beyda | |
| 6,006,109 A | 12/1999 | Shin | |
| 6,009,338 A | 12/1999 | Iwata et al. | |
| 6,016,142 A | 1/2000 | Chang et al. | |
| 6,018,571 A | 1/2000 | Langlois et al. | |
| 6,029,072 A | 2/2000 | Barber | |
| 6,035,214 A | 3/2000 | Henderson | |
| 6,055,439 A | 4/2000 | Helin et al. | |
| 6,058,304 A | 5/2000 | Callaghan et al. | |
| 6,064,734 A | 5/2000 | Hasegawa et al. | |
| 6,069,648 A | 5/2000 | Suso et al. | |
| 6,073,027 A * | 6/2000 | Norman et al. | 455/575.4 |
| 6,084,951 A | 7/2000 | Smith et al. | |
| 6,097,391 A | 8/2000 | Wilcox | |
| 6,101,531 A | 8/2000 | Egglestorl et al. | |
| 6,115,248 A | 9/2000 | Canova et al. | |
| 6,119,179 A | 9/2000 | Whitridge | |
| 6,133,916 A | 10/2000 | Bukszar et al. | |
| 6,137,469 A | 10/2000 | Wu et al. | |
| 6,157,630 A | 12/2000 | Adler et al. | |
| 6,166,342 A | 12/2000 | Chou | |
| 6,169,911 B1 | 1/2001 | Wagner et al. | |
| 6,188,917 B1 | 2/2001 | Laureanti | |
| 6,192,118 B1 | 2/2001 | Bayless et al. | |
| 6,198,053 B1 | 3/2001 | Chou | |
| 6,208,879 B1 | 3/2001 | Iwata et al. | |
| 6,215,865 B1 | 4/2001 | McCalmont | |
| 6,233,469 B1 | 5/2001 | Watanabe | |
| 6,243,452 B1 | 6/2001 | O'Shaughnessey et al. | |
| 6,256,631 B1 | 7/2001 | Malcolm | |
| 6,259,449 B1 | 7/2001 | Saxena et al. | |
| 6,259,932 B1 | 7/2001 | Constein | |
| 6,262,716 B1 | 7/2001 | Raasch | |
| 6,278,884 B1 | 8/2001 | Kim | |
| 6,295,372 B1 | 9/2001 | Hawkins et al. | |
| 6,297,795 B1 | 10/2001 | Kato et al. | |
| 6,297,945 B1 | 10/2001 | Yamamoto | |
| 6,310,609 B1 | 10/2001 | Morgenthater | |
| 6,317,313 B1 | 11/2001 | Mosgrove et al. | |
| 6,317,781 B1 | 11/2001 | De Boor et al. | |
| 6,333,973 B1 | 12/2001 | Smith et al. | |
| D454,349 S | 3/2002 | Makidera et al. | |
| 6,370,018 B1 | 4/2002 | Miller et al. | |
| D456,794 S | 5/2002 | Laverick et al. | |
| 6,389,124 B1 | 5/2002 | Schnarel et al. | |
| 6,397,084 B1 | 5/2002 | Wicks et al. | |
| 6,405,172 B1 | 6/2002 | Baker et al. | |
| 6,415,138 B2 | 7/2002 | Sirola et al. | |
| 6,424,369 B1 * | 7/2002 | Adair et al. | 348/76 |
| 6,442,263 B1 | 8/2002 | Beaton et al. | |
| D462,354 S | 9/2002 | Kimbre et al. | |
| 6,445,577 B1 | 9/2002 | Madsen et al. | |
| 6,452,588 B2 | 9/2002 | Griffin et al. | |
| D464,962 S | 10/2002 | MacGregor et al. | |
| 6,462,941 B1 | 10/2002 | Hulick et al. | |
| 6,466,202 B1 | 10/2002 | Suso et al. | |
| 6,469,910 B2 | 10/2002 | Lefort | |
| 6,483,445 B1 | 11/2002 | England | |
| 6,483,697 B1 | 11/2002 | Jenks et al. | |
| 6,502,090 B1 | 12/2002 | Raisanen | |
| D468,714 S | 1/2003 | Maruska et al. | |
| 6,512,507 B1 | 1/2003 | Furihata et al. | |
| D470,842 S | 2/2003 | Bhatia et al. | |
| 6,516,202 B1 | 2/2003 | Hawkins et al. | |
| 6,525,715 B2 * | 2/2003 | Uchiyama et al. | 345/169 |
| D471,559 S | 3/2003 | De Saulles | |
| 6,535,749 B1 | 3/2003 | Iwata et al. | |
| D473,580 S | 4/2003 | Nakahara | |
| 6,542,721 B2 | 4/2003 | Boesen | |
| 6,549,149 B2 | 4/2003 | McIntyre et al. | |
| 6,557,004 B1 | 4/2003 | Ben-Shactar et al. | |
| 6,577,721 B1 | 6/2003 | Vainio | |
| 6,583,806 B2 | 6/2003 | Ludwig et al. | |
| D477,114 S | 7/2003 | Sheng | |
| D477,597 S | 7/2003 | Laverick et al. | |
| 6,587,700 B1 * | 7/2003 | Meins et al. | 455/575.8 |
| 6,636,203 B1 | 10/2003 | Wong et al. | |
| 6,636,419 B2 | 10/2003 | Duarte | |
| 6,640,114 B2 * | 10/2003 | Bae | 455/566 |
| 6,643,124 B1 | 11/2003 | Wilk | |
| 6,643,529 B1 | 11/2003 | Inoue et al. | |
| 6,658,272 B1 * | 12/2003 | Lenchik et al. | 345/164 |
| 6,661,404 B1 | 12/2003 | Sirola et al. | |
| D488,478 S | 4/2004 | Laverick et al. | |
| 6,751,473 B1 * | 6/2004 | Goyal et al. | 455/556.1 |
| 6,781,575 B1 | 8/2004 | Hawkins et al. | |
| 6,792,090 B1 | 9/2004 | Kobayashi | |
| 6,882,326 B2 * | 4/2005 | Hirayama et al. | 345/1.1 |
| 6,898,301 B2 * | 5/2005 | Iwanaga | 382/124 |
| 6,947,158 B1 | 9/2005 | Kitamura et al. | |
| 6,961,593 B1 | 11/2005 | Lonka et al. | |

| | | | |
|---|---|---|---|
| 6,973,217 | B2 | 12/2005 | Bolick et al. |
| 6,976,217 | B1 | 12/2005 | Vertaschitsch et al. |
| 7,007,239 | B1 | 2/2006 | Hawkins et al. |
| 7,058,168 | B1 | 6/2006 | Knappe et al. |
| 7,069,056 | B2 | 6/2006 | Iwata et al. |
| 7,092,747 | B2* | 8/2006 | Park et al. ................. 455/575.4 |
| 7,155,419 | B2 | 12/2006 | Blackman et al. |
| 7,231,208 | B2 | 6/2007 | Robertson et al. |
| 7,269,450 | B2* | 9/2007 | Lee et al. ................. 455/575.1 |
| 2001/0034222 | A1 | 10/2001 | Roustaei et al. |
| 2001/0046886 | A1 | 11/2001 | Ishigaki |
| 2002/0042853 | A1 | 4/2002 | Santoh et al. |
| 2002/0044136 | A1 | 4/2002 | Griffin et al. |
| 2002/0044216 | A1* | 4/2002 | Cha ............................ 348/376 |
| 2002/0082043 | A1 | 6/2002 | Wilska et al. |
| 2002/0115478 | A1 | 8/2002 | Fujisawa et al. |
| 2002/0133378 | A1 | 9/2002 | Mault et al. |
| 2002/0140667 | A1 | 10/2002 | Horiki |
| 2002/0154745 | A1 | 10/2002 | Shtivelman |
| 2002/0169924 | A1 | 11/2002 | Chan et al. |
| 2002/0191160 | A1 | 12/2002 | Chuang |
| 2003/0008679 | A1 | 1/2003 | Iwata et al. |
| 2003/0034987 | A1 | 2/2003 | Webb et al. |
| 2003/0064751 | A1 | 4/2003 | Charlier et al. |
| 2003/0071791 | A1* | 4/2003 | Hanson et al. ............... 345/169 |
| 2003/0090468 | A1* | 5/2003 | Finke-Anlauff ............. 345/169 |
| 2003/0112225 | A1 | 6/2003 | Granberg |
| 2003/0122779 | A1 | 7/2003 | Martin et al. |
| 2003/0128190 | A1 | 7/2003 | Wilbrink et al. |
| 2003/0137493 | A1* | 7/2003 | Chuang ....................... 345/169 |
| 2003/0228863 | A1 | 12/2003 | Vander Veen et al. |
| 2003/0228888 | A1 | 12/2003 | Adamson |
| 2004/0008827 | A1 | 1/2004 | Martin et al. |
| 2004/0023643 | A1 | 2/2004 | Vander Veen et al. |
| 2004/0026136 | A1 | 2/2004 | Hill et al. |
| 2004/0028192 | A1 | 2/2004 | Pelletier |
| 2004/0028199 | A1 | 2/2004 | Carlson |
| 2004/0039794 | A1 | 2/2004 | Biby et al. |
| 2004/0062367 | A1 | 4/2004 | Fellerstein et al. |
| 2004/0155909 | A1 | 8/2004 | Wagner |
| 2004/0203977 | A1 | 10/2004 | Kennedy |
| 2004/0240163 | A1 | 12/2004 | Adams et al. |
| 2005/0267975 | A1 | 12/2005 | Qureshi et al. |
| 2006/0015819 | A1 | 1/2006 | Hawkins et al. |
| 2006/0033706 | A1 | 2/2006 | Hawkins et al. |
| 2006/0121938 | A1 | 6/2006 | Haitani et al. |
| 2006/0160566 | A1 | 7/2006 | Plahte et al. |
| 2006/0161858 | A1 | 7/2006 | Hawkins et al. |
| 2006/0168539 | A1 | 7/2006 | Hawkins et al. |

FOREIGN PATENT DOCUMENTS

| | | |
|---|---|---|
| EP | 0704788 | 4/1996 |
| EP | 1051012 | 11/2000 |
| EP | 1107101 | 6/2001 |
| EP | 1220517 | 7/2002 |
| FR | 2760933 | 9/1998 |
| GB | 2289595 | 11/1995 |
| JP | 2001024762 | 1/2001 |
| WO | WO99/08238 | 2/1999 |
| WO | WO01/13605 | 2/2001 |

OTHER PUBLICATIONS

Final Office Action mailed Mar. 13, 2006, for US 2003/0034987, 10 pages.

"3GPP2 Multimedia Messaging System—MMS Specification Overview—Revision: A. Mobile Messaging", May 2003, [online] [Retrieved on Dec. 10, 2004] Retrieved from the internet: URL: http://www.lebodic.net/left.htm.

"An Introduction to Mobile Messaging," Mobile Messaging, May 2003, [online] [Retrieved on Dec. 10, 2004] Retrieved from the Internet: URL: http://www.lebodic.netlintro.htm.

"At Last, Technology Harnesse [sic]One of the Most Powerf [sic] Forces know to Men.", Go Corporation, 14 pages, Foster City, (1991).

"AT&T New Release, NCR Cuts Price of 3170 Notebook Computer 11 to 19 Percent", 2 pages [online], retrieved from the Internet: URL: http://www.att.com/press/0393/930308.nca.html., (Mar. 8, 1993).

"Definition of Handheld Computer", printed from thte website: http://dictionary.reference.com, dated Feb. 11, 2004 (3 pgs).

"Definition of Handheld", printed from thte website: http://searchmobilecomputing.techtarget.com, dated Feb. 11, 2004 (3 pgs).

"Excerpts from Ericsson Mobile Phone 1888 World User's Guide", Copyright 1998 Ericsson Mobile Communications AB.

"Handheld" Game Console—Wikipedia, the free encyclopedia, [online] [Retrieved on Oct. 13, 2006], Retrieved from the Internet: URL: http://en.wikipedia.org/wjkwHandheld_game_console.

"IBM Selects Racotek Data/Voice Communications Services to Interface with Touchmobile Product", PR Newswire, Jan. 26, 1993, 2 pages.

"IBM Touchmobile Information and Planning Guide", International Business Machines Incorporated, Mar. 1993, 20 pages.

"IBM TouchMobile Solution for Data Capture and Communication, Keeping Your Business Moving in the 90's,International Business Machines Incorporated, Jan. 1993, 13 pages".

"IBM's Touchmobile Helps Field Workers Collect Data at the Touch of a Finger", PR Newswire, Jan. 26, 1993, 1 page.

"Nokia, Frequently Asked Questions",http://www.nokia.com.in/nokiaapac/india/faqs_list/0,18778,39_41,00.html, Nov. 17, 2003.

"PCT Notification of Transmittal of International Preliminary Examination Report", PCT/US2000/22182, (Oct. 26, 2001), 6 pages.

"Printout of various website pages from biz.yahoo.com article "Conference Calling Added to BestNet's Service Designated for Palm OS(R) Handhelds"—Tuesday, Aug. 21, 2001".

"The Handheld Computing Industry—2000", Stanford Technology Ventures Program (STVP), (Jan. 13, 2001), pp. 1-38.

Agrawal, P. et al., "Get Wireless: A Mobile Technology Spectrum", IT PRO, IEEE, (Jul./Aug. 1999), 18-23.

American Programmer, American Programmer, Inc., NY, (Dec. 1991), 4-33.

Caar, R.M. "The Point of the Pen". Byte, Reprinted, Feb. 1991, 10 pages.

Chan, E. et al., "Personal Digital Assistants & Wireless Convergence", MGMT 557 Strategic Managementof Innovation, (May 4, 2000), 1-28.

Communication Solutions ™ TMC Labs Test Drive, Mar. 2000, Retrieved from the Internet: URL:https://www.tmcnet.com/articles/comsol/0300/0300labs1.htm.

Cowart, T.,Mastering Windows 95—The Windows 95 Bible, (1995), 110-117, 352-359, SyBex, USA.

Cullen, A. "Connecting with Your EO Cellular Module", EO, Inc. Mountain View., (1992, 1993), ii-33.

Cullen, A. "Getting Started with Your EO Personal Communicator", EO, Inc. Mountain View., (1992, 1993), ii-74.

Cullen, A. "Lookup Guide to the EO Personal Communicator", EO, Inc. Mountain View., (1992, 1993), ii-320.

Dyszel, B., "Handspring Visor for Dummies", IDG Books Worldwide, Inc, (2000), o. 13, 15, 121, 122, 123, 208.

Excerpts from Handspring VisorPhone ™ User's Guide, Copyright 2000 Handspring, Inc.

Excerpts from Motorola Timeport Tri-Band Mobile Telephone Manual, Copyright 1999 Motorola, Inc.

GO Corporation Information Statement, 218 pages, (Nov. 8, 1993).

Hewlet Packard, Products and Services, http://www.hp.com/, Nov. 11, 2001.

Ikeya, B. "Detailed Overview of the PC Card Standard, PCMCIA", http://www.pcmcia.org/pccarcJstandard.htm., (1998).

Introduction to PCMCIA Technical Tutorial, Dec. 6, 2002. pp. 1-11.

Kanellos, M. "Qualcomm Merges Phone, Handheld", CNET News.com, Sep. 21, 1998 http://www.news.com/Qualcomm+merges+phone%2C+handheld/2100-1001_3-215791.html.

MacNeill, D. "Messaging Card and NewtonMail: We Pick Up and Delver", On The Go Magazine,http://www.pencomputing.com/Newton/NewtonNotes2.html, 2 pages.

MacNeill, D. "Wireless Newton Technology Goes to Work", On The Go Magazine, Oct. 13, 1993,http://www.pencomputing.com/Newton/NewtonNotes2.html, 2 pages.

Maki, K. "The AT&T EO Travel Guide", John Wiely & Sons, Inc., N.Y. 1993, iii-555.

Microsoft Microsoft Windows & MS_DOS User's Guide, (1993), p. 19, 26.

Microsoft® Windows Version 5.1, copyright 2001 (hereinafter "Windows") (screenshots 1-8).

Nokia Introduces Mobile Chat With Nokia 3310, http://www.mobiletechnews.com/info/2000/09/01/1_42022.htm, (Sep. 1, 2000).

PCT International Search Report, Publication WO 01/13605 A3, (Feb. 22, 2001).

PCT International Search Report, PCT/US2000/22182, (Jan. 10, 2001), 8 pages.

pdQ™ Basics Handbook, Qualcomm Incorporated., (1998, 1999), 96 pages.

Plumley, B., "Ten Minute Guide to Windows NT Workstation 4.O", Que, (Aug. 1996).

Powell, E. "Kyocera pdQ Smartphone—Brief Article—Product Announcement",http://www.findarticles.com/plartjdes/mjmOFAUTis917/ai65650619/print., (2000).

Printout of various website pages from www.bestnetcall.com regarding pdaCall (patent pending), printed Aug. 21, 2001.

Qualcomm pdQ™ 1900 Digital PCTS SmartPhone, Qualcomm Incorporated, (1999), 2 pages.

Schlender, B. R., "Hot New PCs That Read Your Writing", Fortune, Reprinted, (Feb. 11, 1991),6 pages.

Shah, R. "The Qualcomm pdQ: Kill Two Birds with One Phone", CNN.com, http://archives.cnn.com/i999rrECHJptechJi2/o3/qualcomm.pdq, (Dec. 3, 1999).

Stock, R. "The World of Messaging An Introduction to Personal Communications", EO, Inc., Mountain View, (1992, 1993), p. ii-69.

Supplemental European Search Report dated Apr. 24, 2007 in PCT/US02/26197, European Patent Office, 3 pages.

T-Mobile Products; Handhelds, http://www.tmobile.com, (Sep. 28, 2002), 2 pages.

T-Mobile Products; Sidekick, http://www.tmobile.com, (Sep. 28, 2002), 3 pages.

Toshiba Computer Systems Group, http://www.toshiba.com (May 28, 2002), 1 page.

Toshiba Computer Systems Group: Pocket PC e570 http://www.pda.toshiba.com (Jul. 7, 2001), 2 page.

* cited by examiner

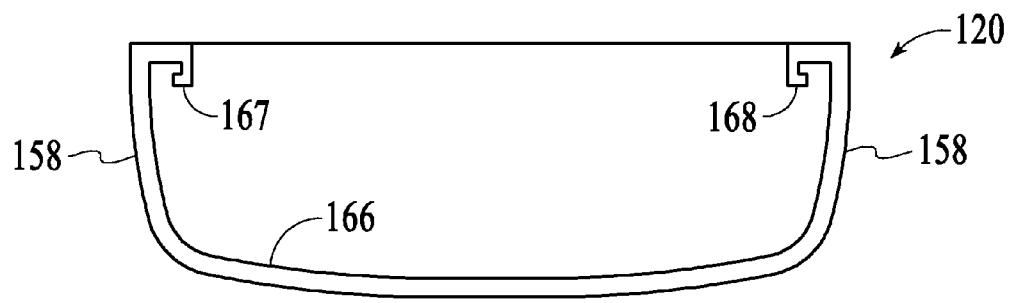
FIG.7
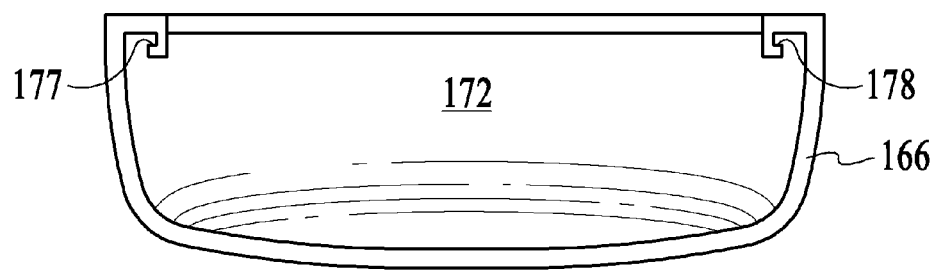
FIG.8
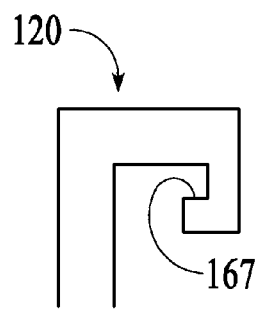 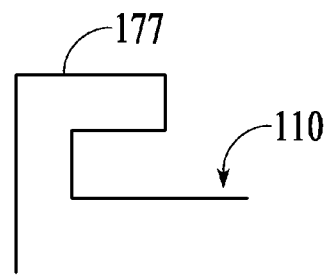
FIG.9A FIG.9B

MOBILE DEVICE HAVING AN ADJUSTABLE LENGTH TO SELECTIVELY EXPOSE A SURFACE COMPONENT

FIELD OF THE INVENTION

The present invention relates to handheld computers. In particular, the present invention relates to a handheld computer having an adjustable length for selectively exposing a surface component.

BACKGROUND OF THE INVENTION

Handheld computers, typically referred to as personal digital assistants (PDAs), are intended to be mobile devices. In general, small sizes are desired for handheld computers to enhance mobility. However, there are constraints to how small a handheld computer can be for convenience of the user. In particular, certain characteristics of handheld computers require a minimum amount of space on the exterior housing of the handheld computer.

Most handheld computers require a minimum size display. The minimum display size is set by balancing considerations such as mobility with the need for the user to view data, such as personal management information, pictures, and text pages. For some handheld computers, the size of the display may also need to be large enough to provide a character input mechanisms for the user. For example, some handheld computers incorporate character recognition logic as a primary means for the user to enter character data into the handheld computer. The displays for the handheld computer may be made to be contact-sensitive. A portion of the display may be combined with logic to provide an immediate character recognizer for recognizing gestures or strokes entered onto a portion of the display as characters. Other displays may be used to display a virtual keyboard. The immediate character recognition regions and virtual keyboards require the displays to be of a minimum size to support those kinds of character entry.

The size of the handheld computer typically must also accommodate mechanical actuators, such as buttons or pivot switches. These are typically placed on the same surface where the display is viewable to enable users to coordinate button actions with what is shown on the display.

As battery and printed circuit board technology becomes more advanced, the display size and mechanical actuators are increasingly becoming the primary factors that determine the size of the handheld computer. Reducing the length of the handheld computer requires sacrificing features of the display and/or buttons.

Sometimes the functionality from two different devices is combined into one unit. But combining devices such as handheld computers with other devices generally leads to a device that is larger than a device having the functionality of only one device. Usually, this is because each type of device has a particular set of hardware features that are exposed on the device. The physical presence of hardware features for each type of device cannot be eliminated when two or more different types of devices are combined.

SUMMARY OF THE INVENTION

Embodiments of the invention provide for a handheld computer having an adjustable length for selectively exposing a surface component. The length of the handheld computer may be varied between a minimum length and a maximum length. A surface component or feature may be disposed on a surface of the handheld computer's housing such that the component is exposed only when the handheld computer is of at least a designated length, where the designated length is greater than the minimum length. When the surface component is exposed, a processor of the handheld computer automatically executes instructions associated with the surface component.

In one embodiment, a handheld computer automatically launches an application for operating the handheld computer as a digital camera in response to detecting that a lens on an exposable surface of the housing is exposed.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

FIG. 7 is a cross-sectional view of a handheld computer along lines D-D of FIG. 6.

FIG. 8 is a cross-sectional view of a handheld computer along lines E-E of FIG. 5.

FIGS. 9A and 9B illustrate rail components on segments of a housing for the handheld computer, under an embodiment of the invention.

DETAILED DESCRIPTION OF THE INVENTION

Figure 2:
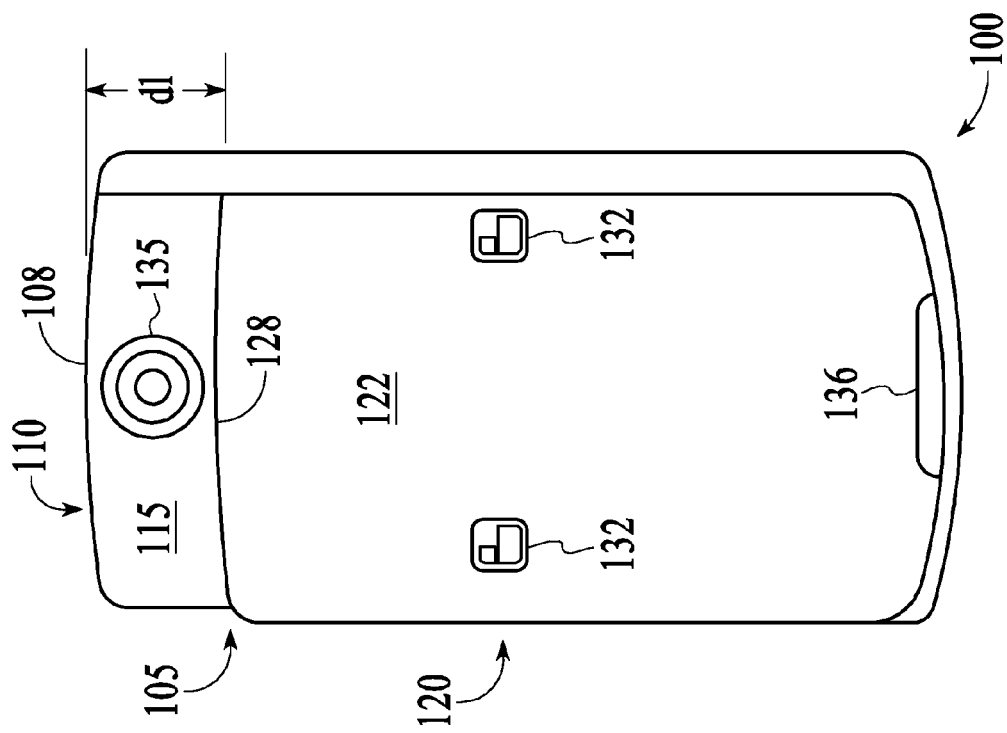
FIG. 2 is a back view of a handheld computer such as shown in FIG. 1, under an embodiment of the invention.

Embodiments of the invention describe a handheld computer having an adjustable length for selectively exposing a surface component. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

Embodiments of the invention include a handheld computer having a housing that can be adjusted in length. The housing may be adjusted to expose a component that is suited for a particular function on the handheld computer. When the housing is adjusted to expose the component, a processor of the handheld computer may automatically launch an application for operating that component.

According to one embodiment, the housing is segmented into two slideably connected segments. For example, one segment may provide a front face for the handheld computer, and another segment may provide a back face for the handheld computer. The two segments may slide relative to one another to enable the length of the handheld computer to be adjusted.

In another embodiment, the housing segments may also be telescoping. The term "telescoping" in the context of the housing for the handheld computer implies that the housing has one portion having a perimeter that is less than another portion. The portion with the smaller perimeter can slide within the portion with the larger perimeter.

According to a variation of an embodiment, an actuation mechanism may be positioned on a surface of the handheld computer to actuate the processor into performing a function when the application is launched. The actuation mechanism may be positioned on a surface that is opposite in orientation to the component. In one embodiment, the component may be positioned on a back side of the handheld computer, and the actuation mechanism may be positioned on a front side of the handheld computer. Both the actuation mechanism and the component may be exposed when the handheld computer is extended to the first length.

Embodiments of the invention provide a handheld computer having a first segment, and a second segment moveably coupled to the first segment so as to be moveable between a contracted position and an extended position. A component is disposed at least partially on one of the first segment or the second segment. The component is positioned so to be exposed and operable when the second segment is moved a distance away from the contracted position towards the extended position. The handheld computer includes a processor that is configured to automatically select an application associated with the component from a plurality of applications operable on the handheld computer in response to the second segment being moved the distance. The processor then automatically launches the application associated with the component when the second segment is moved the distance.

B. Handheld Computer With Adjustable Length And Exposable Component

FIGS. 1-5 are different views of a handheld computer having an adjustable length for exposing a surface component. As will be described, a length of the handheld computer is adjustable to expose a component for operation in conjunction with an application that can be executed by the handheld computer. For purpose of description, embodiments of the invention are described with the exposable component being a lens for use in capturing images. Other types of components that may be disposed on an exposable surface of the adjustable handheld computer are contemplated and described elsewhere in the application.

Figure 1:
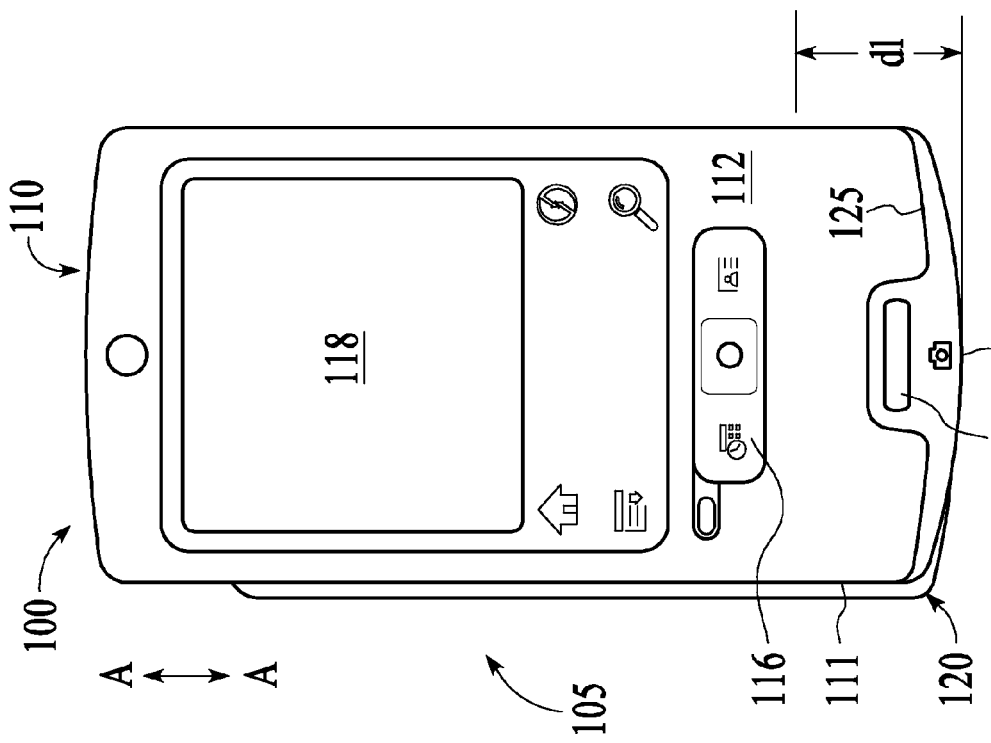
FIG. 1 is a front view of a handheld computer having an adjustable length, under an embodiment of the invention, under an embodiment of the invention.

FIG. 1 is a front view of a handheld computer having an adjustable length, under an embodiment of the invention. A handheld computer 100 has an adjustable length housing 105 that can extend between a contracted position and an extended position. The arrow line A-A illustrates the motion of housing 105. A length of housing 105 is minimum when it is in the contracted position, and maximum when it is in the extended position. The housing 105 may be formed from a first segment 110 slideably connected to a second segment 120 to move between the contracted and extended position. In one embodiment, first segment 110 provides a front face 112 for handheld computer 100 when housing 105 is in the contracted position, and second segment 120 provides a back face 122 (FIG. 2) for handheld computer 100 when the housing 105 is in the contracted position.

In an embodiment, front face 112 provided on first segment 110 includes a display 118 and one or more keys 116 for operating handheld computer 100. The display 118 may be contact-sensitive. A handwriting recognition area 119 may be provided on a lower portion of display 118 to enable alphanumeric entry. Alternatively, a keyboard or keypad, mechanical or digital in nature, may be provided somewhere on front face 112 to enable alphanumeric entry.

The handheld computer 100 may be configured to operate as a PDA or similar device. Accordingly, handheld computer 100 may be used to execute personal information management (PIM) applications, including including calendar applications for maintaining appointments, address book applications for maintaining contact information, to-do applications to maintain lists, and memo applications to allow entries of memos. Other applications that may be used by a PDA type device include word processing applications, graphic applications for jotting illustrations, and spreadsheets. A PDA type device is any device that operates such applications, or that is able to receive alphanumeric input. A typical operating system that may be operated by handheld computer 100 includes PALM OS (manufactured by PALM INC.) and POCKET PC (manufactured by MICROSOFT CORP.).

FIG. 1 illustrates handheld computer 100 when housing 105 is in the extended position. The first segment 110 is moved a differential length dl from a bottom edge 121 of second segment 120 to expose an interior side 125 to second segment 120. An actuation mechanism 124 is provided on the interior side 125. In this way, the actuation mechanism 124 is exposed only when housing 105 is in the extended position. The actuation mechanism 124 may correspond to a pressable button or similar mechanism that acts as a shutter-bug for the handheld computer 100 when it is used as an image capturing device.

In the contracted position, first segment 110 would overlay second segment 120, so that the differential length dl would not be present. A bottom edge 111 of first segment 110 would align with the bottom edge 121 of second segment 120. The interior surface 125 of second segment 120 would not be viewable, and actuation mechanism 124 would not be accessible.

FIG. 2 is a back view of the handheld computer shown in FIG. 1. As shown by FIG. 2, an exposable component is disposed on housing 105 to enable handheld computer 100 to perform additional functions that require use of the component.

The second segment 120 provides the back face 122 for handheld computer 100. One or more apertures 132 for connecting to accessory devices are provided on back face 122. A connector 136 may be provided on the back bottom edge of second segment 120 to enable handheld computer 100 to electrically connect with other accessory devices, such as keyboards, travel chargers and modems. In the extended position, a top edge 108 of first segment 110 is vertically separated from a top edge 128 of second segment 120 by a length dl. When in the extended position, an interior surface 115 of first segment 110 is exposed. A lens 135 is provided on the interior surface 115. The lens 135 may be formed into an opening on the surface of handheld computer 100, and include one or more light focusing elements that focus an image on a plurality of light detecting sensors. Circuitry may signal data representing captured images to a processor of handheld computer 100. The lens 135 is exposed in the extended position, the lens 135 can be operated in conjunction with a camera application to enable handheld computer 100 to digitally capture images.

In the contracted position, a top edge 108 of first segment 110 would align with the top edge 128 of second segment 120. The interior surface 115 of first segment 110 would be overlaid by second segment 120 when in the contracted position. As a result, the lens 135 would be hidden and not operable with handheld computer 100.

Figure 3:
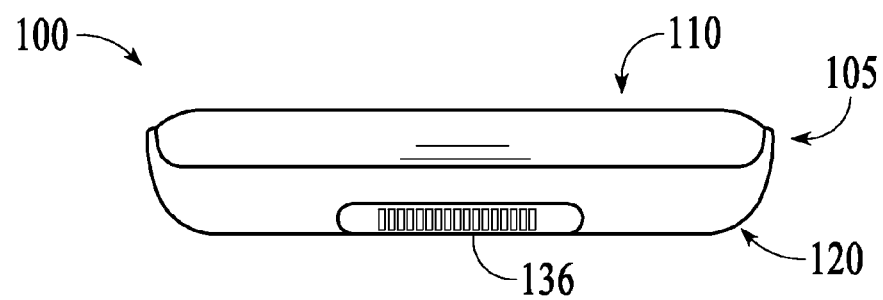
FIG. 3 is a bottom view of a handheld computer such as shown in FIGS. 1 and 2, under an embodiment of the invention.

FIG. 3 is a bottom view of handheld computer 100, under an embodiment of the invention. The first segment 110 and second segment 120 may slide into and out of the paper in order to adjust the length of housing 105. The connector 136 may correspond to a serial port, provided on second segment 120.

Figure 4:
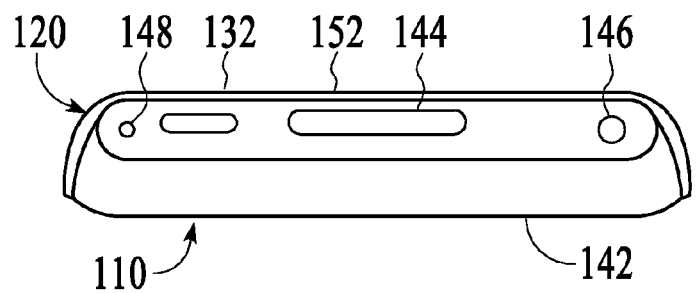
FIG. 4 is a top view of a handheld computer such as shown in FIGS. 1 and 2, under an embodiment of the invention.

FIG. 4 is a top view of handheld computer 100, under an embodiment of the invention. As shown, first segment 110 may be thicker than second segment 120 towards the top region. A top surface 142 of first segment 110 may provide an infrared port 144, a stylus opening 146 and a jack 148, as well as other features. A top surface 152 of second segment 120 may be a thin shell.

Figure 5:
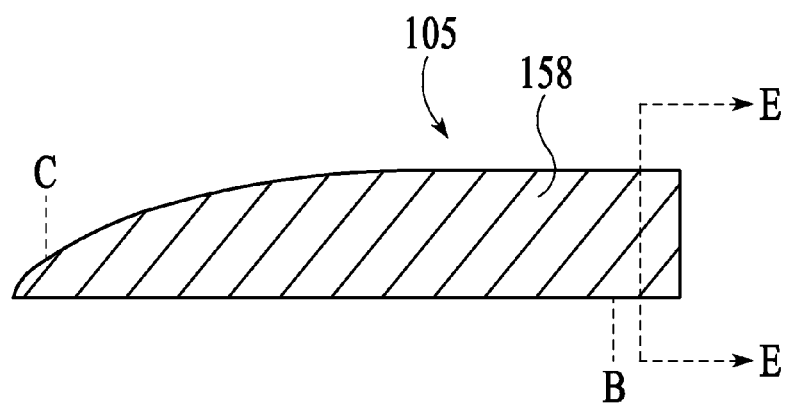
FIG. 5 is a side view of a housing for a handheld computer in a contracted position, under an embodiment of the invention.

FIG. 5 is a side view of housing 105 in a contracted position. In the contracted position, the handheld computer 100 may appear to be formed of a single segment when viewed from the side. The second segment 120 may include sidewalls 158 that extend upward to encompass side regions of first segment 110. Line B indicates a position of lens 135. Line C indicates a position of actuation mechanism 124.

Figure 6:
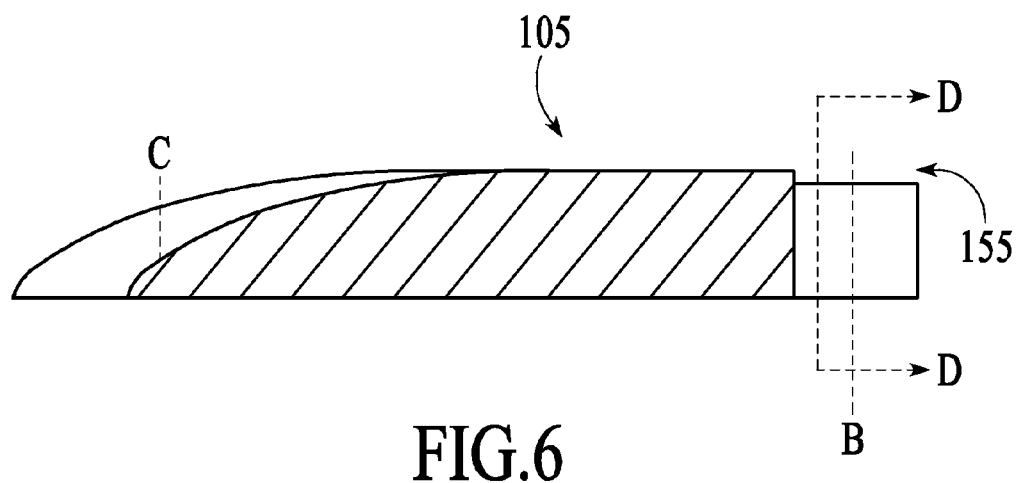
FIG. 6 is a side view of housing for a handheld computer in an extended position, under an embodiment of the invention.

FIG. 6 is a side view of housing 105 in an extended position. An extended thickness 155 of first segment 110 my protrude from sidewalls 158 of second segment 120. The location of lens 135 (FIG. 2), indicates by line B, is changed so as to expose the lens. Similarly, the position of the actuation mechanism has also changed.

C. Housing Construction

Embodiments of the invention provide for a handheld computer that is configured to include a first housing segment that is moveably or slideably coupled to a second housing segment. The first and second housing segments are moveable relative to one another so that a housing of the handheld computer can be adjusted to a first length corresponding to the first and second housing segment being moved to a contracted position, and a second length greater than the first length corresponding to the first and second housing segment being moved to an extended position.

FIGS. 7 and 8 illustrate a rail construction for enabling first segment 110 of handheld computer 100 (as shown in FIGS. 1-4) to slideably couple to second segment 120. FIG. 7 is a cross-sectional view of handheld computer 100 along lines D-D of FIG. 6. In the portion viewed, only second segment 120 is occupying the cross-section, since the handheld computer 100 is in the extended position. The portion of second segment 120 shown may correspond to a shell 166 that protects the interior surface 115 (FIG. 2) of first segment 110 when housing 105 is in the contracted position. A first rail 167 and second rail 168 may be formed or otherwise integrated into the shell 166. The first rail 167 and second rail 168 may be formed on an interior side to the portion of second segment 120 corresponding to sidewalls 158. The rails 167, 168 are configured to slideably receive corresponding rail members 177, 178 from first segment 110.

FIG. 8 is a cross-sectional view of handheld computer 100 along lines E-E of FIG. 5. In the portion viewed, first segment 110 and second segment 120 are occupying the same cross-section, as handheld computer 100 is in the contracted position. A thickness 172 of first segment 110 occupies a volume defined by shell 166. The first segment 110 may be provided with rail members 177, 178 (see FIG. 8) that slideably engage rails 167, 168.

FIGS. 9A and 9B illustrate rail components on segments of a housing for the handheld computer, under an embodiment of the invention. In FIG. 9A, one shape for rail 167 is provided on second segment 120. A symmetric shape may be provided for the other rail member. In FIG. 9B, a rail member 177 configured to be received and slide along rail 167 is shown. The rail member 177 may be provided on side edges of first segment 110. Rail member 178 may have the symmetric shape to be received and slide along rail 168 of second segment 120.

An extended position between first segment 110 and second segment 120 may be formed by using biasing mechanisms or stops that interfere with the forward and/or reverse travel of rail members 177, 178 within corresponding rails 167, 168. For example, rail members 177, 178 may be laterally spring-loaded and contractable in the direction of the bias to enable the rail members 177, 178 to travel the lengths provided by rails 167, 168. The contraction of rail members 177, 178 may be accomplished by partially exposing the rail members so that users can contract the rail members inward. The length of the rail members 177, 178 may be a small portion of the overall length provided by corresponding rails 16, 167 so that the rail members can be easily pushed within corresponding rails 167, 168.

Several other mechanisms may be used to enable such a housing construction. For example, U.S. application Ser. No. 09/932,213, entitled HANDHELD COMPUTER HAVING MOVEABLE SEGMENTS THAT CAN BE ADJUSTED TO AFFECT A SIZE OF THE HANDHELD COMPUTER, filed Aug. 17, 2001, and naming William Webb et al. as inventors, hereby incorporated by reference in its entirety, illustrates another way in which a handheld computer may be constructed to have moveable housing segments. In an embodiment, the two housing segments that form the handheld computer may telescope with respect to one another.

Another technique for providing a housing for a handheld computer having moveable segments is U.S. patent application Ser. No. 10/006,537, entitled INTEGRATED HANDHELD DATA PROCESSING DEVICE HAVING A SLIDING FORM FACTOR, filed Nov. 30, 2001, and naming Huy Nguyen and Lawrence Lam as inventors, the aforementioned patent application being hereby incorporated by reference in its entirety.

D. Method For Operating Handheld Computer With Exposable Component

Figure 10:
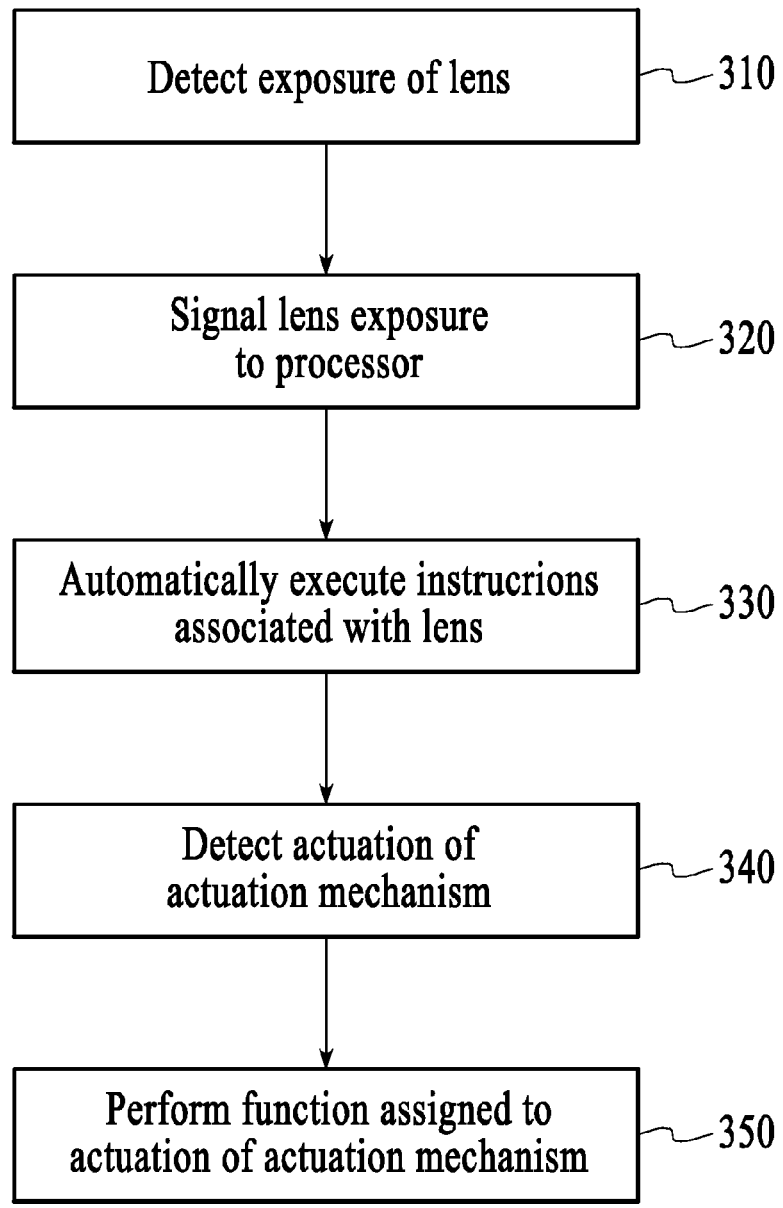
FIG. 10 illustrates a method for operating a handheld computer in conjunction with exposing a lens on a surface of the handheld computer.

FIG. 10 is a method for operating a handheld computer in conjunction with exposing a lens on a surface of the handheld computer. Reference to numerals of FIG. 1 is intended for illustration only.

In step 310, lens 135 is detected as being exposed. This may be accomplished when second segment 120 is extended from first segment 110 a length sufficient to expose the lens 135. Several mechanisms may be used to accomplish this step. In one embodiment, a switch(not shown) or other mechanism may be activated by the relative positions of first segment 110 and second segment 120 being extended to a certain position.

Step 320 provides that detection of the lens 135 being exposed is signaled to the processor. In one embodiment, an interrupt is signaled to the processor upon activation of the switch or other mechanism corresponding to when lens 135 is exposed.

In step 330, the processor automatically executes one or more instructions in order to prepare handheld computer 100 for use of lens 135. These instructions are previously associated with lens 135. The instructions may be part of an application or program previously associated with the lens 135. In one embodiment, a camera application or program is automatically launched upon detection that lens 135 is exposed.

In step 340, the processor detects actuation of actuation mechanism 124. For example, a user may press the actuation mechanism 124 when first segment 110 and second segment 120 are in the extended position so as to expose the actuation mechanism on interior surface 115. This step may be independent of step 330. For example, an application launched in step 330 may be operated on handheld computer 100 independently of the actuation mechanism 124 being actuated. The actuation of the actuation mechanism 124 may be one form of entering input when the application associated with the exposed surface component is launched.

In step 350, actuation of actuation mechanism 124 may signal to the processor to cause one or more pre-assigned functions to be performed. These functions may be part of the application or program executed in step 340. For example, if a cameral application is launched upon detection of lens 135 being exposed, actuation of actuation mechanism 124 may signal the processor to capture an image using lens 135 and the camera application.

While reference is made to components of FIG. 1 in the description of FIG. 10, a method such as described by FIG. 10 may be used with other embodiments of the invention. For example, some other type of exposable component other than lens 135 may be employed on an exposable surface of housing 105. The use of an actuation mechanism 124 to cause the processor to execute functions associated with use of handheld computer 100 is also optional.

E. Use Of Handheld Computer As Camera

Figure 11:
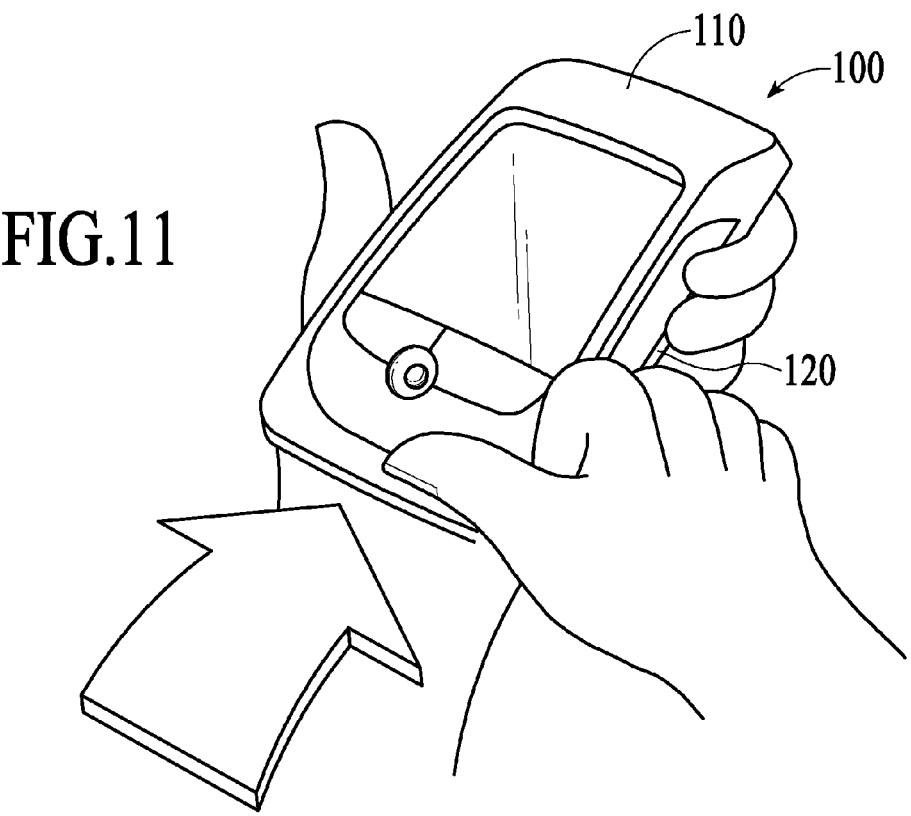
FIG. 11 is an isometric front view of a user gripping a handheld computer in an orientation common for use in PDA type devices, under an embodiment of the invention.
Figure 12:
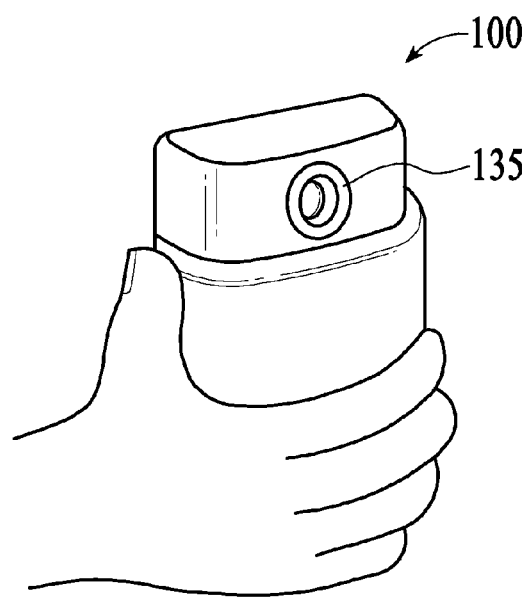
FIG. 12 illustrates a configuration for enabling a user to alter the grip on a handheld computer for capturing images.

FIGS. 11 and 12 illustrate use of handheld computer 100 from a PDA type device to a camera. FIG. 11 is an isometric front view of a user gripping the handheld computer 100 in an orientation common for use in PDA type devices. From this orientation, the user can push first segment 110 upward while maintaining second segment 120 in a fixed position. This exposes lens 135 (see FIG. 1).

FIG. 12 illustrates the user altering the grip on handheld computer 100 to use the handheld computer as a camera. The handheld computer 100 can be gripped sideways, or alternatively maintained in the orientation shown in FIG. 11. Once the lens 135 is exposed, the handheld computer 100 may be actuated to digitally capture and store images.

F. Hardware Diagram Of Handheld Computer

Figure 13:
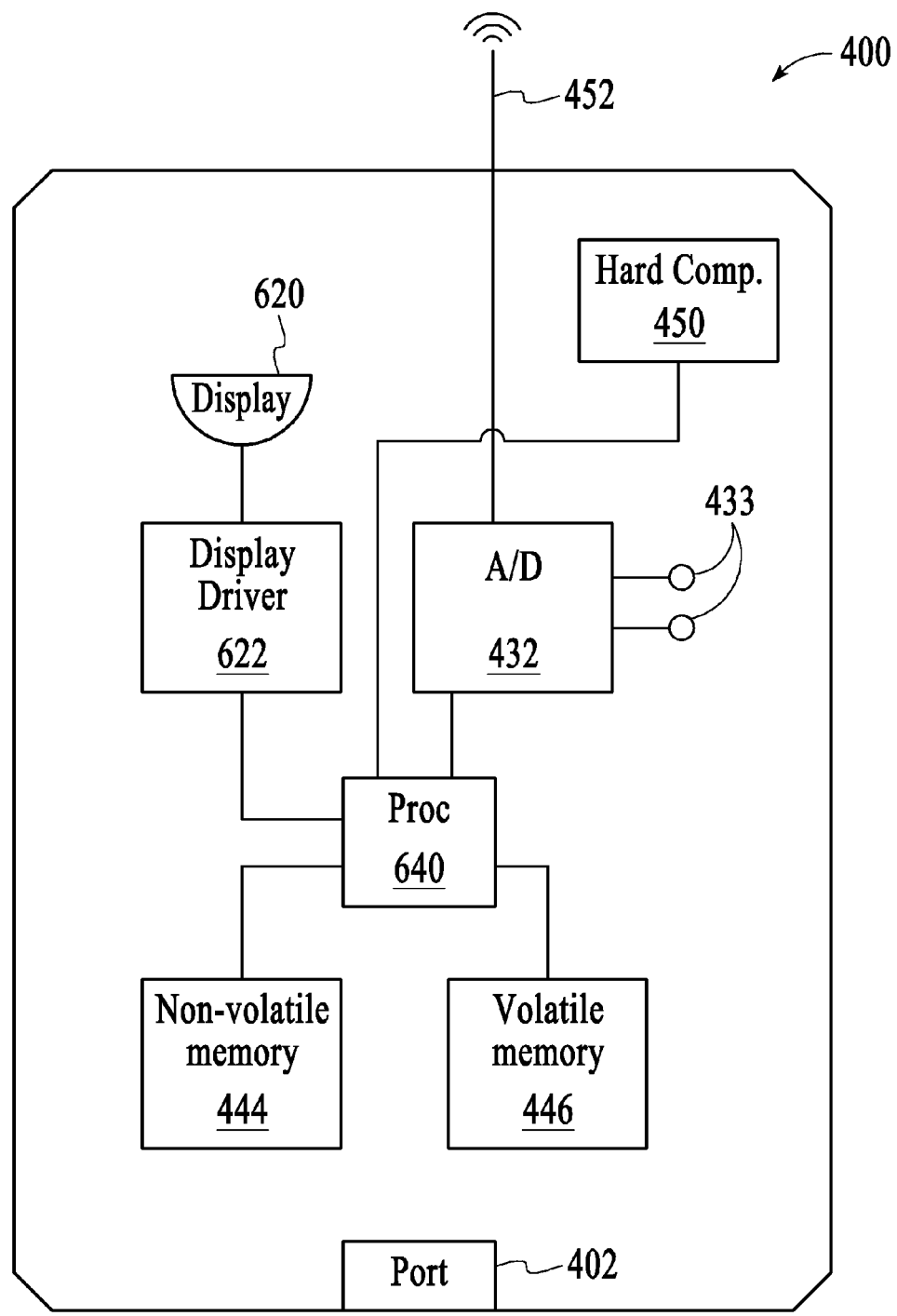
FIG. 13 is a block diagram of a handheld computer, under an embodiment of the invention.

FIG. 13 is a block diagram for a handheld computer 400, under an embodiment of the invention. The handheld computer 400 may correspond to an embodiment such as shown in FIG. 1, where a housing of the handheld computer has moveable segments and an exposable surface feature.

In an embodiment, handheld computer 400 includes a processor 440 coupled to a first memory 444 (non-volatile) and a second memory 446 (volatile). The processor 440 is coupled to a display driver 422. The processor 440 combines with display driver 422 to process and signal data for presentation on a display assembly 420. The display assembly 420 may include a screen and a digitizer.

An analog-digital (AD) converter 432 is coupled to processor 440. One or more channels 433 from A/D converter 432 maybe used to convert analog input provided by the digitizer, or by another analog input mechanism.

The handheld computer 400 may include one or more expansion ports for coupling to accessory devices, such as cradles, modems, memory units, re-chargers and other devices. Examples of expansion ports include serial ports, Universal serial Bus (USB) ports, CompactFlash slots and infra-red ports. In an embodiment shown, a first expansion port 402 enables one or more types of expansion modules to be connected to processor 440. The handheld computer 400 may also include other expansion ports for other accessory devices.

A set of hardware components 450 may be coupled to processor 440. The set of hardware components 450 may include a surface feature such as described by FIGS. 1-2. The set of hardware components, for example, may include a lens, along with internal components to transmit data representing captured images to processor 440. Other components that may be included in addition to or as alternatives for the setoff hardware components 450 may include, for example, the following: microphones, speakers, data ports (infrared and radio-frequency), light pointers, and receivers.

G. Alternative Embodiments

While embodiments described herein primarily describe the exposable component of the handheld computer as being a lens, other embodiments may employ other hardware components and surface features. Exposure of these other components and surface features may cause handheld computer to execute instructions previously associated with that component or feature.

Examples of hardware components and surface features that may be used under different embodiments of the invention include microphones, speakers, wireless communication ports (such as infrared ports), and laser pointers. Each of these components may be associated with a set of instructions, a program or an application. When the components are exposed, the associated instructions, application or program are executed.

While several embodiments described herein provide for a processor of the handheld computer to automatically execute a set of instructions (such as in an application or program) in response to detecting that the component is exposed, other embodiments may rely on manual input to cause the processor to execute such instructions or launch such applications or programs. For example, the processor may execute the set of instructions or application only in response to actuation of actuation mechanism 124 (FIG. 1) or other button on one of the housing surfaces. But the actuation mechanism may be enabled only when the associated component is exposed.

H. Conclusion In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A mobile device comprising:
 a housing comprising a first housing segment and a second housing segment, wherein the first housing segment and the second housing segment are moveable relative to each other so that the housing telescopes between a contracted position having a minimum length and an extended position having a maximum length, wherein the second housing segment has a perimeter that is contained within the first housing segment in both the extended position and the contracted position;
 a lens at least partially disposed on a first interior surface of the housing so that (i) the lens is at least partially exposed when the housing is adjusted to have a first length that is greater than the minimum length, and (ii) the lens is hidden when the housing is adjusted to have a second length that is less than the first length;

a plurality of user-interface mechanisms, the plurality of user-interface mechanisms including a display provided on one of the first housing segment or the second housing segment, wherein the plurality of user-interface mechanisms do not include the lens;

wherein the first segment and the second segment combine to form a continuous interior volume that is defined by both the first segment and the second segment, the continuous interior volume containing a plurality of components, including a processor;

wherein the first interior surface on which the lens is disposed at least partially defines the interior volume in both the extended and contracted positions;

wherein the processor is configured to either enable, or automatically launch, an application for enabling a user to capture images with the mobile device, in response to the housing being adjusted to have at least the first length, wherein the application enables a user to operate the lens through interaction with one or more of the plurality of user-interface mechanisms; and an actuation mechanism that is actuable by a user to cause the processor to use the lens to capture an image, wherein the actuation mechanism is positioned on a second interior surface so that the actuation mechanism is exposed when the housing is adjusted to have at least the first length.

2. The mobile device of claim 1, wherein the second interior surface is oriented in an opposite direction from the first interior surface.

3. The mobile device of claim 2, further comprising a display that is oriented in a same direction as the actuation mechanism.

4. The mobile device of claim 1, wherein the first housing segment and the second housing segment combine to define a continuous interior volume that contains the processor.

5. The mobile device of claim 1, wherein the second housing segment has a cross-section along a length of the second housing segment that has a perimeter that is completely contained within the first housing segment in both the extended position and the contracted position.

6. A mobile device comprising:
a first housing segment;
a second housing segment that is slideable and moveably coupled to the first housing segment so that a perimeter of the second housing segment is contained substantially within the first housing segment in both a contracted position and an extended position and is moveable relative to the first housing segment between the contracted position and the extended position;
wherein the second housing segment, in combination with the first housing segment, defines an interior volume of a housing;
wherein the first housing segment includes sidewalls that extend to encompass side regions of the second housing segment, and wherein the first housing segment and the second housing segment combine to define a continuous interior volume that contains a processor;
a lens at least partially disposed on one of the first housing segment or the second housing segment to overlay the interior volume of the housing, wherein the lens is positioned to be exposed and operable when the first or second housing segment is adjusted so that the component is at least a first a distance from the contracted position, and wherein the lens is positioned to be hidden when the first or second housing segment is adjusted so that the lens is less than the first distance from the contracted position;

a plurality of user-interface mechanisms, the plurality of user-interface mechanisms including a display provided on one of the first housing segment or the second housing segment, wherein the plurality of user-interface mechanisms do not include the lens;

wherein the processor is configured to operate, when the second housing segment is adjusted so that the component is the first distance from the contracted position, by either enabling or automatically launching an application for use with the lens, wherein the application enables a user to operate the lens through interaction with one or more of the plurality of user-interface mechanisms;

wherein the second housing segment has a cross-section along a length of the second housing segment that has a perimeter that is completely contained within the first housing segment in both the extended position and the contracted position; and an actuation mechanism that is actuable by a user to cause the processor to use the lens to capture an image, wherein the actuation mechanism is positioned on a second interior surface so that the actuation mechanism is exposed when the housing is adjusted to have at least the first length.

7. The mobile device of claim 6, wherein the processor and lens are configured to cooperate in order to capture a still image in a digital format.

8. The mobile device of claim 6, wherein the processor and lens are configured to cooperate in order to capture video.

9. The mobile device of claim 6, wherein the lens is not operable when the second housing segment is adjusted so that the lens is less than the first distance from the contracted position.

10. A mobile device comprising:
a housing comprising an interior volume that is defined by both of a first housing segment and a second housing segment, wherein the first housing segment and the second housing segment are moveable relative to each other, and wherein the second housing segment has a cross-section along a length of the second housing segment that has a perimeter that is completely contained within the first housing segment in both the extended position and the contracted position to enable the housing to telescope between a contracted position having a minimum length and an extended position having a maximum length;
a lens at least partially disposed on a first surface to overlay the interior volume of the housing, the lens being disposed so that (i) the lens is at least partially exposed when the housing is adjusted to have a first length that is greater than the minimum length, and (ii) the lens is hidden when the housing is adjusted to have a second length that is less than the first length;
a plurality of user-interface mechanisms, the plurality of user-interface mechanisms including a display provided on one of the first housing segment or the second housing segment, wherein at least some of the plurality of user-interface mechanisms are positioned to be hidden from use when the housing is adjusted to the minimum length; and
a processor configured to either enable, or automatically launch, an application for enabling a user to capture images with the mobile device, in response to the housing being adjusted to have at least the first length, wherein the application enables a user to operate the lens through interaction with at least one of the plurality of user-interface mechanisms;

wherein the at least one of the plurality of user-interface mechanisms for enabling the user to operate the lens is actuatable to signal the processor and the lens to capture images when the device is positioned to have at least the first length but not the second length.

11. The mobile device of claim 10, further comprising a display provided on at least one of the first housing segment or the second housing segment.

12. The mobile device of claim 10, further comprising a keyboard provided on at least one of the first housing segment and the second housing segment.

13. The mobile device of claim 10, wherein the processor is further configured to automatically launch an application associated with the lens being exposed.

14. A mobile device comprising:
- a housing comprising an interior volume that is defined by a first housing segment and a second housing segment, wherein the first housing segment and the second housing segment are moveable relative to each other so that the housing telescopes between a contracted position having a minimum length and an extended position having a maximum length, wherein the second housing segment has a cross-section along a length of the second housing segment that has a perimeter that is completely contained within the first housing segment in both the extended position and the contracted position;
- a lens at least partially disposed on a first interior surface to overlay the interior volume of the housing, the lens being disposed so that (i) the lens is at least partially exposed when the housing is adjusted to have a first length that is greater than the minimum length, and (ii) the lens is hidden when the housing is adjusted to have a second length that is less than the first length;
- a plurality of user-interface mechanisms, the plurality of user-interface mechanisms including a display provided on one of the first housing segment or the second housing segment wherein one or more of the interface mechanism are exposed for use when the housing is adjusted to have the first length;
- a processor configured to enable, or automatically launch, an application for enabling a user to capture images with the mobile device, in response to the housing being adjusted to have at least the first length, wherein the application enables a user to operate the lens through interaction with one or more of the plurality of user-interface mechanisms; and
- wherein at least one of the user-interface mechanisms provides an actuation mechanism for enabling input to be entered for the application for capturing images, the actuation mechanism being enabled only when the housing is adjusted to have at least the first length.

* * * * *